Dec. 1, 1964 F. PELTO Re. 25,691

HAND TRUCK

Original Filed June 17, 1959 2 Sheets-Sheet 1

INVENTOR

Frank Pelto

BY

Watson, Cole, Grindle & Watson

ATTORNEYS

Dec. 1, 1964 F. PELTO Re. 25,691

HAND TRUCK

Original Filed June 17, 1959 2 Sheets-Sheet 2

INVENTOR

Frank Pelto

BY

Watson, Cole, Grindle & Watson

ATTORNEYS

United States Patent Office

Re. 25,691
Reissued Dec. 1, 1964

25,691
HAND TRUCK

Frank Pelto, Spencer, N.Y., assignor, by mesne assignments, to Dominick L. Pezzuti, Endicott, N.Y.

Original No. 3,003,654, dated Oct. 10, 1961, Ser. No. 821,030, June 17, 1959. Application for reissue Oct. 8, 1963, Ser. No. 320,248
2 Claims. (Cl. 214—370)

Figure 1:
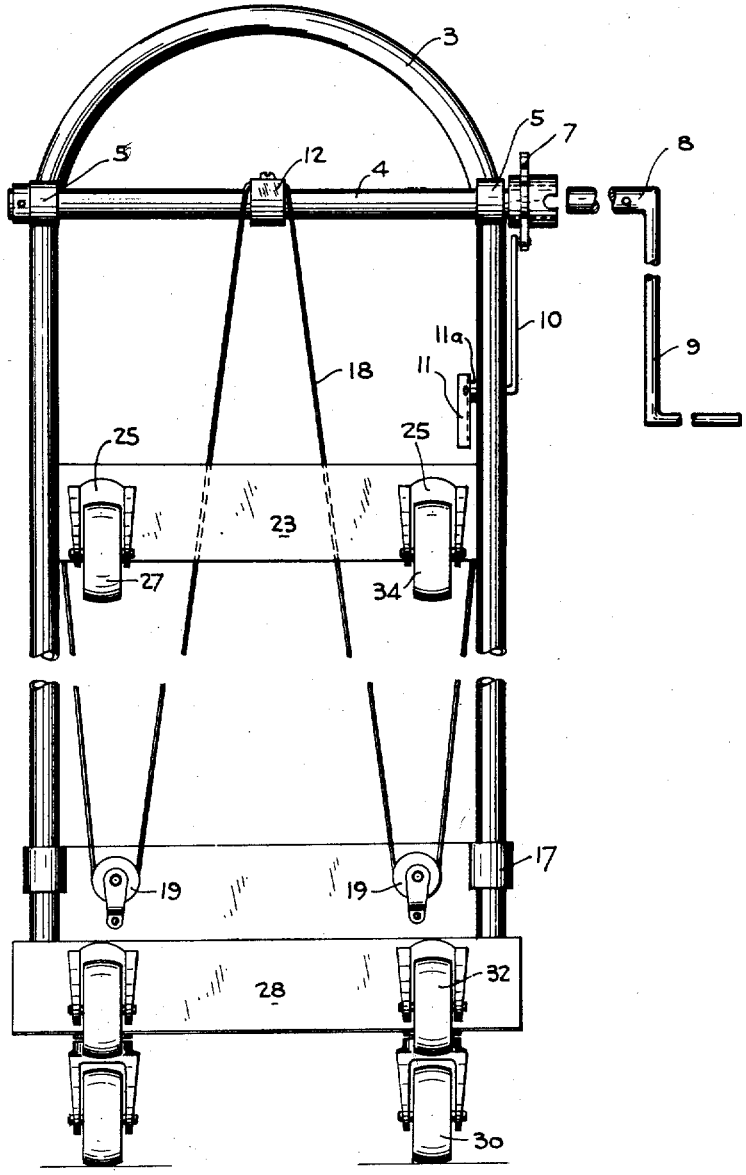

Matter enclosed in heavy brackets [ ] appears in the original patent but forms no part of this reissue specification; matter printed in italics indicates the additions made by reissue.

This invention relates to hand trucks and more particularly to an improved multipurpose hand truck.

Priorly, numerous types of hand trucks have been employed for the lifting and moving of relatively heavy items, such as desks, bookcases, refrigerators, stoves, dryers, washers, etc. These trucks exhibited certain disadvantages. These trucks are particularly difficult to manipulate when loading the truck and pivoting it into a position to transport a heavy load. They are also difficult to handle when heavily loaded because a substantial downward force must be manually counterbalanced by the operator. Further, few of these trucks provide sufficient flexibility to permit their use in any one of several positions.

Accordingly, it is an object of this invention to provide a hand truck of improved construction.

It is another object of this invention to provide an improved hand truck which is easy to handle and exhibits flexibility of operation.

It is a still further object of this invention to provide an improved hand truck which is capable of lifting heavy objects and moving these objects with much less force on behalf of the operator than the devices priorly known.

Briefly, in accordance with aspects of this invention, the truck frame is provided with a lifting plate slidably mounted on the truck frame, a windlass or winch for lifting the lift plate and two pairs of wheels swivel-or caster-mounted adjacent one end of the truck. The lift plate is so connected to the frame as to slide to a position in which the end of the lift plate abuts the floor when the frame is in an upright position.

Advantageously, the two sets of wheels are swivel-mounted on axes which are at an angle with respect to each other such that the wheels provide a complete support for the load when the truck is tilted to an inclined position. The swivel-mounted wheels are moved to a position such that the first pair of wheels, which pivot about an axis parallel to the truck frame, may be pivoted to a position immediately adjacent the lift plate and thus effectively move the fulcrum closer to the load. This movement of the fulcrum defining wheels facilitates the manual pivoting of the frame to an inclined position by decreasing the length of the lever arm of the load.

Also, advantageously, the second pair of wheels, which may be mounted to pivot about an axis perpendicular to the axis of pivot of the first pair of wheels, may be pivoted to a position more remote from the first pair of wheels to provide a wider base for supporting the load. Further, the combination of the movable lift plate and the pivotally mounted wheels permits the center of gravity of the load to be shifted until it lies in a plane passing between the first and second pairs of wheels. Accordingly, when the load is pivoted into transporting position and properly shifted by the winch, the operator does not need to exert an upward force to support the load. A third pair of wheels may be provided intermediate the frame so that the frame may be pivoted to a horizontal position and supported by the second and third pairs of wheels in a manner well known in the art.

Accordingly, it is a feature of this invention to provide a truck with a frame and two pairs of pivotally, or swivel mounted wheels adjacent the end of the frame, the pairs of wheels being mounted to pivot about axes angularly disposed with respect to each other.

It is another feature of this invention to provide a truck with two pairs of wheels pivotally mounted adjacent one end of the truck and to provide the truck with a lift plate and a winch or other means for lifting the lift plate so that the load may be moved to a position intermediate the axes of the pairs of wheels and thus be supported entirely by the pairs of wheels.

It is a still further feature of this invention to provide a truck with a first and second pair of tandem casters which are mounted perpendicularly with respect to each other, one of the pairs of casters being mounted with their axes parallel to the frame of the truck so that this pair of casters may pivot to a position immediately adjacent the lift plate on the truck when the lift plate is extended to floor level to thus facilitate the pivoting of the hand truck and the load supported thereon.

It is another feature of this invention to provide a hand truck with pivotally mounted pairs of casters adjacent the lower end of the hand truck, the axis of pivot being perpendicular to each other such that the pairs of casters may be pivoted toward and away from each other so that the load may be placed in a position to have its center of gravity lie in a plane between the casters, movement of the load relative to the frame being accomplished by means of a lift plate and suitable apparatus for moving this lift plate relative to the frame.

*The hand truck of my invention can also be used as a dolly and when two of the trucks shown herein are used, one at each end of the load, a heavy bulky object can be easily transported.*

Figure 2:
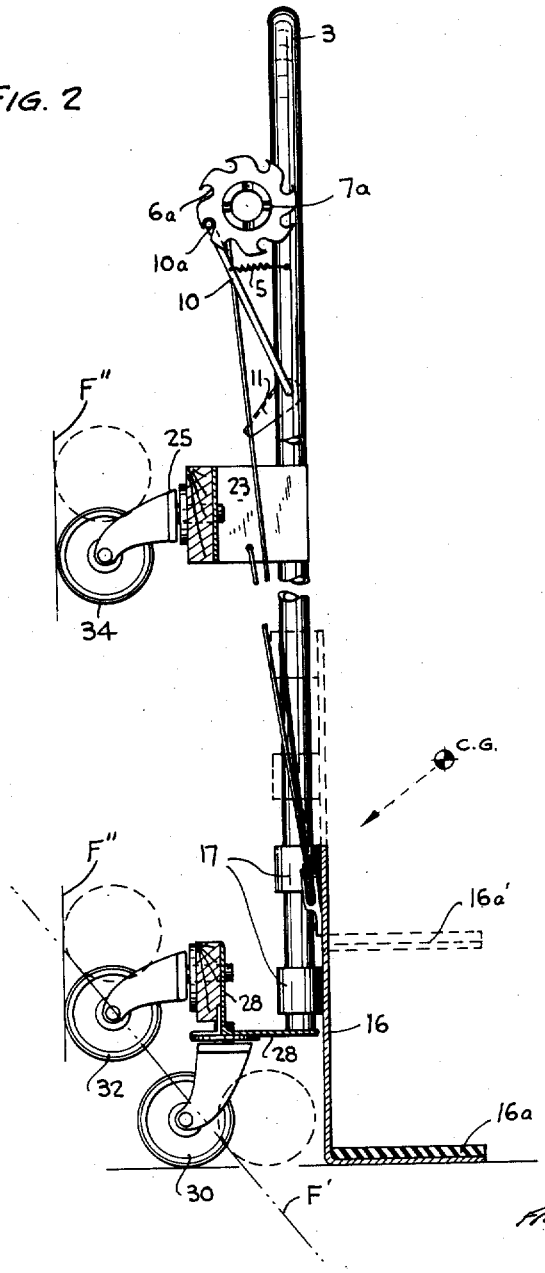

These and various other objects and features of this invention will be more clearly understood from a reading of the detailed description of the invention in conjunction with the drawing, in which:

FIGURE 1 is a rear view in elevation of one illustrative embodiment of this invention; and FIGURE 2 is a side view of FIGURE 1.

Referring now to the drawing, there is shown a truck frame 3 which, advantageously, may be in the form of a U and may be formed of tubular material. A winch axle 4 is rotatably mounted near the top of the frame 3 by means of a pair of bushings 5. The winch is provided with a ratchet wheel 6 mounted on an axle 7 which is secured to the shaft 4 by any convenient means such as by welding. The winch is provided with a handle 9 having pins 8 thereon, which pins are positioned to engage notches 7a in the axle 7.

The ratchet is provided with an arm 10 having a pin 10a, which engages the ratchet teeth 6a to prevent the release of a load supported on the truck. A spring S is connected between the arm 10 and the frame 3 to move the pin 10a into engagement with the teeth 6a. The arm 10 is provided with a manual release 11 which is secured to the arm 10 by a suitable means such as by bolt 11a and nuts 11b, as best seen in FIGURE 1.

A load lift plate 16 is provided with two pairs of sleeves 17 which slidably engage the frame 3 to permit movement of the load relative to the frame in a manner which will be subsequently described.

The winch is connected to the lift plate 16 by a suitable cable, such as cable 18, which passes over pulleys [20] *19 secured to the lift plate* and is secured to the axle 4 by means of a clamp 21. A cross member 23 is secured to the U frame 3 intermediate the ends of the frame and this cross member 23 supports a pair of base members 25 on which are mounted a third pair of tandem casters *27 and* 34. A right angle plate 28 is secured to the end of the frame 3 by any convenient means, such as by welding and right angle plate 28 has a first pair of tandem casters 30 supported therefrom with the caster axles parallel to the frame 3. The second pair of casters 32 is advantageously connected to the angular member 28 with the caster *swivel* axes perpendicular to the *swivel* axes of the first pair of casters [32] *30* and perpendicular to the frame 3.

The operation of the truck is as follows. When the truck is to engage the load resting upon the floor [F], the truck is moved or pivoted into a vertical position, as shown in FIGURE 2, and the lift plate 16 is lowered by releasing the lock 11 on the winch. When the perpendicular portion 16a of the lift plate 16 engages the floor, the plate stops. The frame 3 is then manually pushed forward until the angular portion 16a of the plate 16 is beneath the load. The first set of casters 30 are then rotated from the positions shown in solid lines in FIGURE 2 to the positions shown in dotted lines. This rotation of the first set of casters effectively moves the fulcrum of pivot closer to the load and the frame 3 may then be pivoted to a position in which the frame assumes an angular position relative to the floor such that the floor is in a position F′, shown in dotted lines in FIGURE 2. The second set of casters 32 have been pivoted to a position in dotted lines in FIGURE 2 or they will be so pivoted as soon as an attempt is made to move the truck in a forward direction. From the different positions of the pairs of casters 30 and 32, shown in FIGURE 2, it is apparent that the casters are moved further apart so that the center of gravity, C.G., of the load may lie in a plane between the casters 30 and 32. Further, the winch handle 9 may be rotated to move the lift plate angular portion 16a to a position 16a′, as shown in FIGURE 2 in dotted line, or at any position intermediate these two positions so that the load center of gravity will lie in a plane between the axles of the first and second pairs of casters 30 and 32. Accordingly, the operator need not support any of the load but need only apply a force sufficient to overcome the friction of caster wheels to transport the load to its ultimate position.

When the ultimate position of the load has been obtained, the truck may again be tilted into a vertical position with relative ease since the pivot point is very close to the load, namely, that of the axle of the first set of casters 30.

As an alternative arrangement for transporting the load, the truck may be pivoted into a position such that the second and third pairs of casters 32 and 34, respectively support the frame 3 in a horizontal position with respect to the floor F″. In such a position the third set of casters 34 may freely pivot to their positions shown in dotted line in FIGURE 2. *With the second and third pair of casters supporting the load the truck acts as a dolly.* When the ultimate destination of the load is reached, the frame 3 may then be pivoted to a vertical position, which pivoting will be facilitated by the operation of the dual fulcrum, as defined by the axles of second and first pairs of casters 32 and 30, respectively.

Two of these trucks may be employed together, one on each end of a long object. With this arrangement, the object can be very easily moved about in any direction such as, through narrow doorways. Also, these trucks may be used for moving high objects, such as a refrigerator in a substantially vertical position which eliminates the necessity of tilting the object over. When these trucks are used under either of above mentioned conditions, it is not necessary manually to hold the trucks in place, as that is automatically taken care of by the trucks. The weight applied on the truck lift plate when an object is raised causes the truck to be firmly held against the object. A tough skid resistant rubber mat on the lift plate prevents any heavy object from sliding off. When two trucks are used for moving, the object needs to be lifted only a short distance off the floor such as ½ inch to one inch.

These trucks may also be used as jacks as well as for handling and moving materials. When lifting heavy articles, such as in putting up steam and hot water radiators, these trucks will, with the swivel casters, allow the work to be placed in exact position. Also lifting may be accomplished as well when moving or changing long cabinets in stores. Advantageously, lifting and hauling may also be accomplished with two trucks used in substantially vertical position.

While I have shown and described various embodiments of my invention, it is understood that the principles thereof may be extended to many and varied types of machines and apparatus. The invention, therefore, is not to be limited to the details illustrated and described herein.

What is claimed is:

*1.* A hand truck comprising, (*a*) a frame, (*b*) a load-supporting lift plate slidably mounted on said frame, (*c*) means for lifting said lift plate, (*d*) a first pair of casters secured to said frame with the caster axes parallel to the frame, and (*e*) a second pair of casters secured to said frame, said second pair of casters being positioned with the caster axes perpendicular to the caster axes of said first pair of casters whereby said first and said second casters may be pivoted into a position more remote from each other to support the entire weight of the load, said lift means being adapted to shift the load-supporting lift plate to a position such that the center of gravity of the load lies in a plane passing between said first and said second pair of casters.

*2. A hand truck comprising, in combination,*

(*a*) *an elongated frame,*

(*b*) *a load supporting lift plate slidably mounted on and adjacent one end of said frame and extending substantially normal thereto,*

(*c*) *means for raising and lowering said lift plate,*

(*d*) *a first set of casters having swivel axes parallel to said frame, said casters being located adjacent the load bearing end of said frame, said first set of casters enabling a bulky load to be transported by using two hand trucks and raising the load off the floor by two lift plates at opposite ends of the load,*

(*e*) *a second set of casters adjacent said first set of casters and connected to said frame along lines substantially normal to the swivel axes of said first set of casters, said first and second sets of casters enabling a load to be transported with the frame at a tilt angle to the floor and the load distributed over both sets of casters, and* (*f*) *a third set of casters located remote from the load bearing end of said frame, said third set of casters having swivel axes substantially normal to the swivel axes of the first set of casters enabling a load to be transported with the truck used as a dolly and the load supported by said second and third set of casters.*

References Cited by the Examiner

The following references, cited by the Examiner, are of record in the patented file of this patent or the original patent.

UNITED STATES PATENTS

| | | | |
|---|---|---|---|
| 1,185,615 | 6/16 | Beaumont et al. | 280—47.12 |
| 1,202,507 | 10/16 | Glidden et al. | 280—47.12 |
| 1,591,766 | 7/26 | Mayer | 214—650 |
| 2,235,043 | 3/41 | Ronning | 214—370 X |
| 2,421,123 | 5/47 | Jensen | 214—370 X |
| 2,513,604 | 7/50 | Vandemark | 280—47.12 X |

FOREIGN PATENTS 461,189 11/49 Canada.

HUGO O. SCHULZ, *Primary Examiner.*

ERNEST A. FALLER, JR., *Examiner.*